G. H. BENEDICT.
MACHINE FOR BLACKLEADING MOLDS FOR ELECTROTYPING.
APPLICATION FILED JAN. 7, 1910.

967,160.  Patented Aug. 16, 1910.
6 SHEETS—SHEET 1.

Witnesses:
Robert N. Weir
Harold G. Barrett

Inventor:
George H. Benedict
By Neil & Neil
Attys

G. H. BENEDICT.
MACHINE FOR BLACKLEADING MOLDS FOR ELECTROTYPING.
APPLICATION FILED JAN. 7, 1910.

967,160.

Patented Aug. 16, 1910.

5 SHEETS—SHEET 2.

Witnesses:
Robert H. Weir
Harold G. Barrett

Inventor:
George H. Benedict
By Hill & Hill
Attys

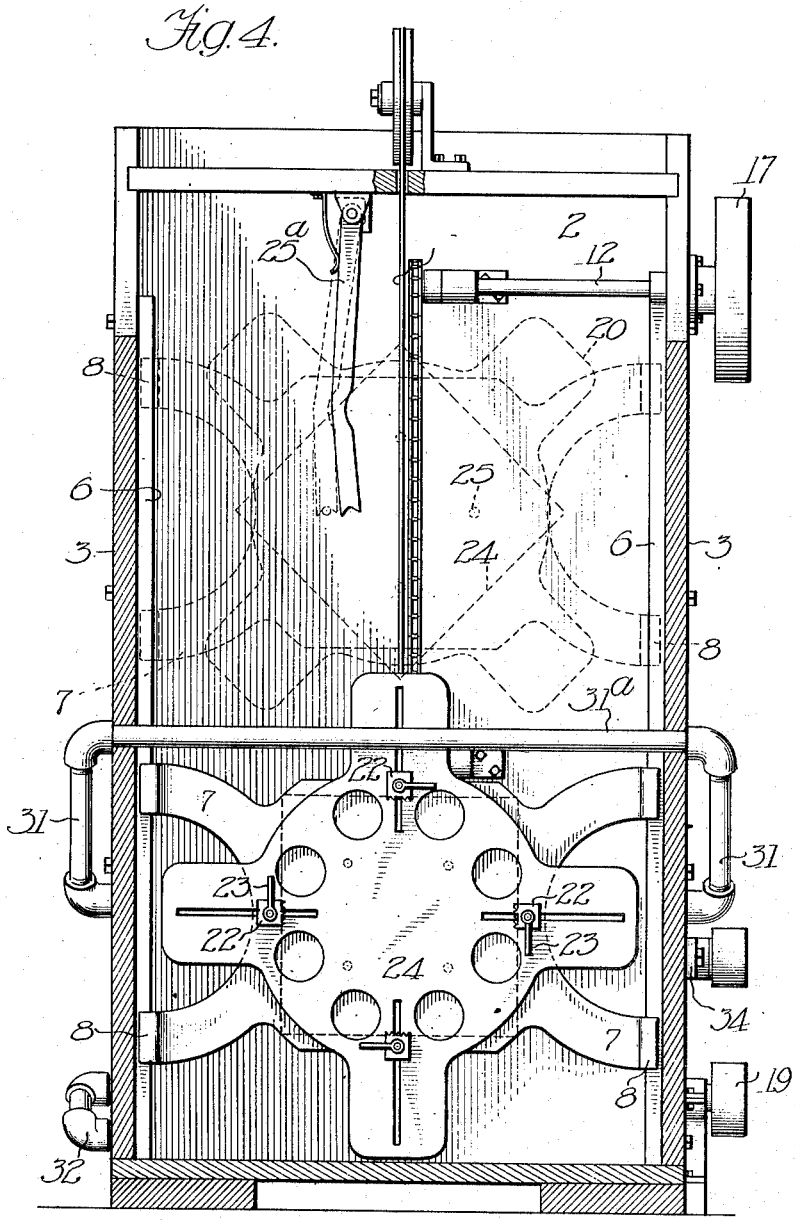

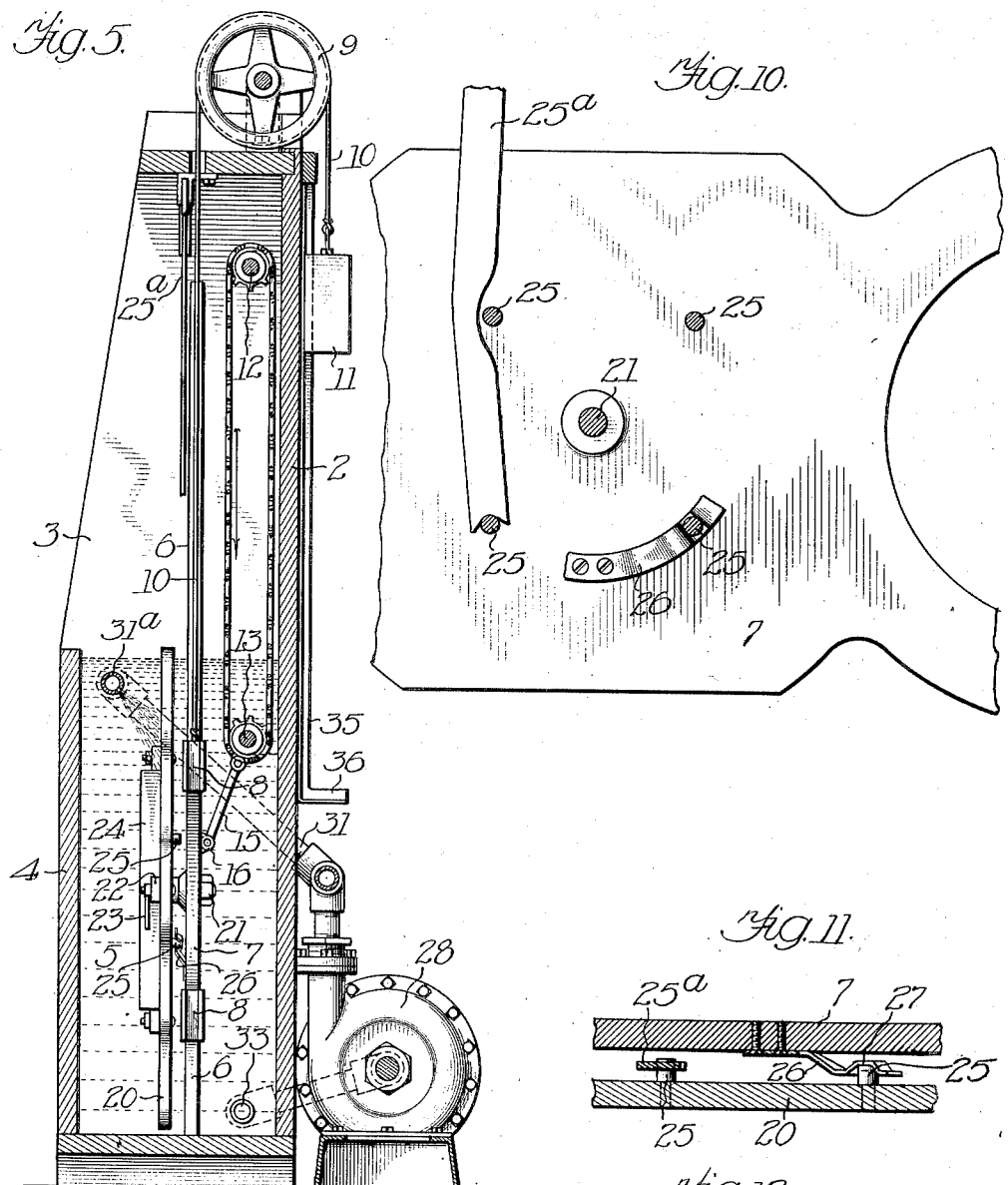

G. H. BENEDICT.
MACHINE FOR BLACKLEADING MOLDS FOR ELECTROTYPING.
APPLICATION FILED JAN. 7, 1910.
967,160.
Patented Aug. 16, 1910.
5 SHEETS—SHEET 5.
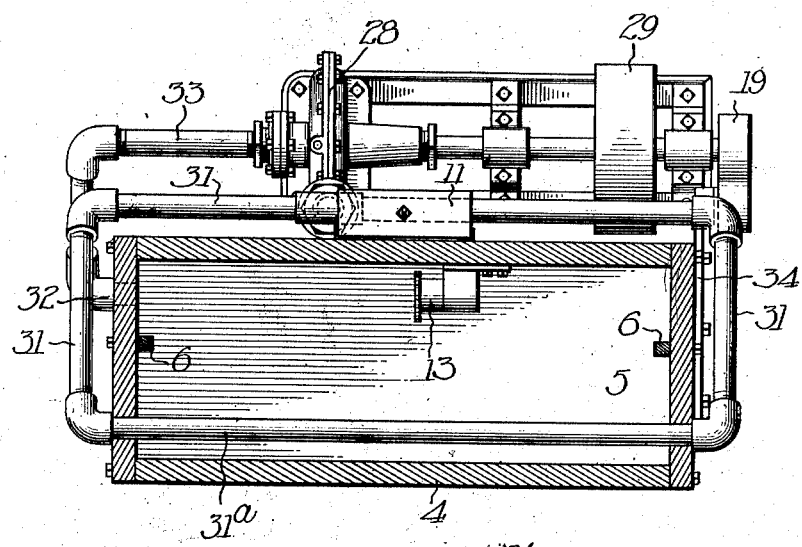
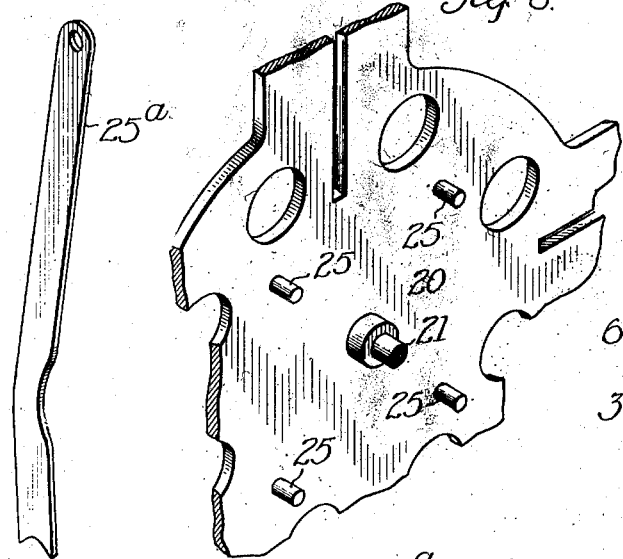
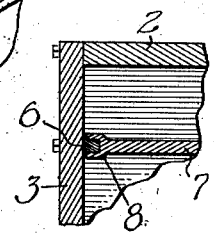
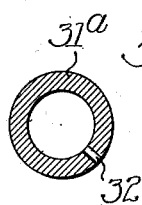
Witnesses:
Robert N. Weir
Harold G. Barrett
Inventor:
George H. Benedict
By Niel & Niel
attys.

UNITED STATES PATENT OFFICE.

GEORGE H. BENEDICT, OF CHICAGO, ILLINOIS.

MACHINE FOR BLACKLEADING MOLDS FOR ELECTROTYPING.

967,160.

Specification of Letters Patent. Patented Aug. 16, 1910.

Application filed January 7, 1910. Serial No. 536,899.

*To all whom it may concern:*

Be it known that I, GEORGE H. BENEDICT, a citizen of the United States, residing at Chicago, in the county of Cook and State of Illinois, have invented certain new and useful Improvements in Machines for Blackleading Molds for Electrotyping, of which the following is a description.

To secure the most satisfactory results in electrotyping, it is necessary after the mold has been made of the pattern form or cut, that a coat of metalizing material, such as graphite, shall be equally and regularly applied in a manner that will cause the least possible damage or injury to the mold. In the use of brushes for applying the graphite the constant application of the finest brush tends to change the mold so as to interfere with the sharpness of the fine lines, and hence the perfection of the result sought. It is necessary that the coat of metalizing material shall be evenly and regularly distributed over all the surfaces of the molds including the depressions and lines of the pattern, in order to secure the most satisfactory results.

The object of my invention is to improve the machines heretofore employed for this purpose, and to this end it consists in the novel construction, arrangement and combination of parts shown and described and more particularly pointed out in the claims.

Figure 1:
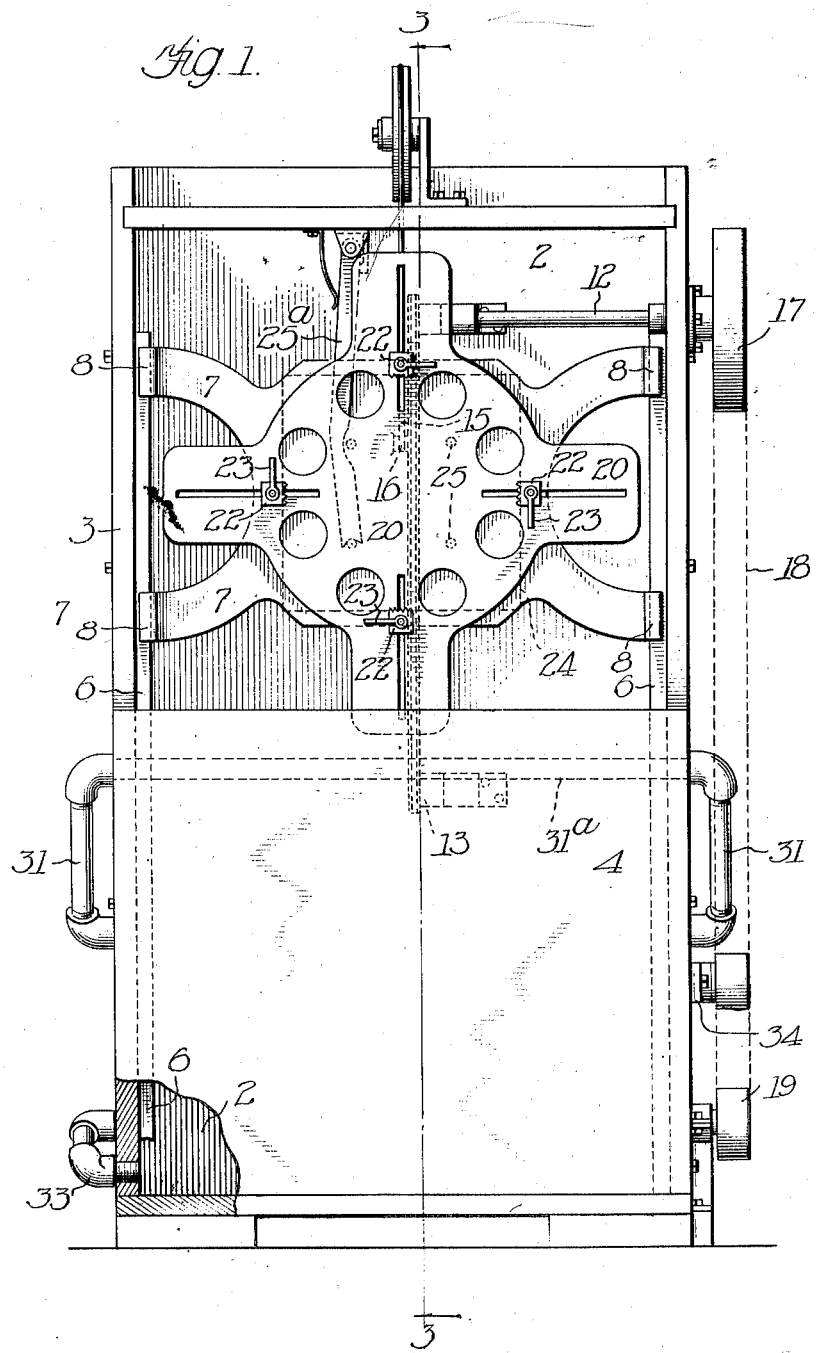
Figure 2:
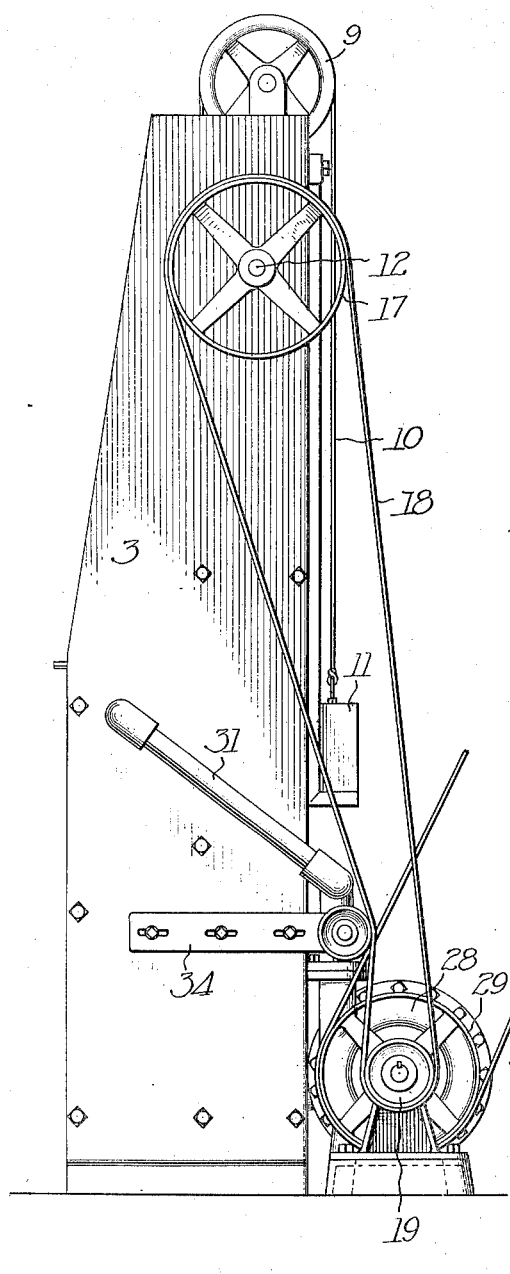
Figure 3:
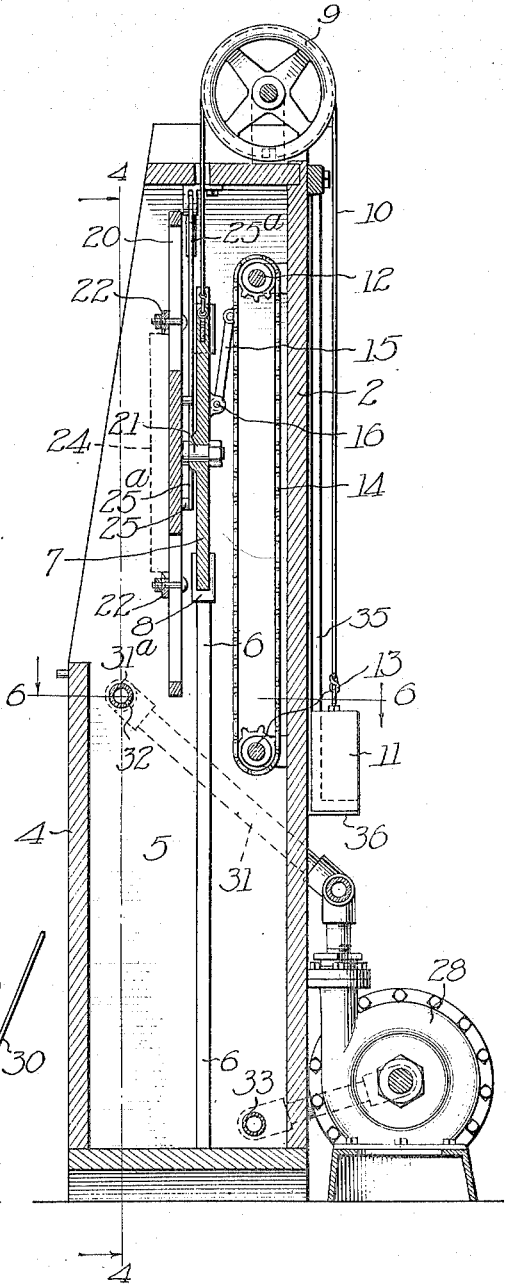

In the drawings illustrating the preferred form of machine wherein like reference characters indicate like or corresponding parts, Figure 1 is a front elevation of my improved machine, Fig. 2 is a side elevation of the same, Fig. 3 is a central vertical section substantially on line 3—3 of Fig. 1, Fig. 4 is a view similar to that shown in Fig. 1, showing the parts in different positions in full and dotted lines, and with the front of the vat or reservoir removed to more clearly illustrate the operation, Fig. 5 in a side elevation with the side removed and showing the matrix or mold and the connecting parts in their lowermost position within the tank or reservoir, Fig. 6 is a horizontal cross section substantially on line 6—6 of Fig. 3, Fig. 7 is a fragmentary sectional view showing the means for guiding the reciprocating frame, Fig. 8 is a partial perspective view with parts broken away, showing the rear face of the rotating bed plate, Fig. 9 is a detail view of a suitable form of engaging lever to rotate the bed plate, Fig. 10 is a partial rear elevation of the reciprocating frame showing the position of the engaging lever and a restraining latch, the projecting pins or studs on the rotating bed plate being shown in section, Figs. 11 and 12 are detail views of a simple form of restraining latch, and Fig. 13 is a sectional view of the front horizontal pipe for directing a sheet or spray of liquid upon the matrix.

As shown in the drawings, the device comprises a back 2, end pieces 3 and a front wall 4 extending part way up to form a vat or reservoir 5 at the lower part thereof. The side walls 3 are provided with suitable guides 6 extending from a point near the top to a point near the bottom of the device and a reciprocating frame or plate 7 is provided with shoes 8 loosely engaging the guides 6 to maintain the reciprocating plate in proper relation with the coöperating parts. In the preferred form a pulley 9 at the top of the device has mounted thereon a cable 10 having one end secured to the top of the reciprocating frame 7 and the other end secured to a counterweight 11 extending outside of the rear wall of the device, as clearly shown in Figs. 3, 4 and 5. In the preferred form also shafts 12 and 13 mounted on the side walls near the back of the device (Figs. 3 and 5) carry sprocket wheels and a chain 14 mounted thereon provided with an arm 15 with its free end attached to the rear face of the plate 7 as at 16. A pulley 17 positioned on the end of the shaft 12 and on the outside wall of the device (Figs. 1, 2 and 4) is driven by means of a belt 18 mounted on and driven by the pulley 19 which is actuated in any preferred manner. The rotation of the pulley 17 serves to rotate the shaft 12 and thus operate the chain 14 to reciprocate the plate 7. Upon the front face of the reciprocating plate 7 is mounted a rotatable bed plate 20 preferably by means of a boss 21 carried by the plate 7. The bed plate is provided with suitable engaging devices 22 which as shown, consist of suitable locking members controlled by a locking bar 23. The matrix or form 24 is positioned upon the face of the bed plate 20 and secured thereto by the locking means 22 and 23, or equivalent members for that purpose. It will thus be seen that the reciprocating plate 7 with the bed plate and matrix secured thereto is alternately carried downward into the vat 5, as shown in Figs. 4 and 5 and lifted therefrom, as shown in Figs. 1 and 3.

Suitable means are provided to partially rotate the bed plate 20 at each reciprocation of the frame 7. Any suitable means may be employed for this purpose. As shown in the drawings, the bed plate 20 is provided with a plurality of projecting pins 25 or equivalent parts, preferably four in number, as clearly shown in Fig. 8 extending from the rear face of the bed plate and toward the reciprocating plate 7. A depending arm 25ª has its free end arranged in the plane between the bed plate and the reciprocating plate, normally in the path of the pins 25 as the reciprocating plate moves upward. As one of the pins engage with the end of the arm the further upward movement of the frame 7 serves to rotate the bed plate with the matrix thereon to give the same a preferable quarter turn. The next downward movement thereafter of the bed plate and matrix is with the latter thus partially turned to bring the face thereof into a different relative position with a sheet or spray of water and graphite projected thereon, as will be hereafter explained. In some cases it may be desirable to provide positive means to prevent the accidental rotation of the bed plate upon the stud 21. Any preferred means may be employed for this purpose. As shown in Figs. 5, 10, 11 and 12, a spring catch 26 provided with a depression 27 is secured upon the reciprocating plate 7 in the path of the projecting bosses or studs 25, the said catch being arranged in position to engage one of said bosses when the bed plate has been rotated to a proper position, and retain the same in said position until the parts have moved downward into the vat or tank and are again rotated on the upward movement as before described.

28 is a suitable pump driven by a pulley 29 and belt 30 (Fig. 2) which is driven from any suitable source of power. Pipes 31—31 extend from the pump on each side of the machine to a point near the upper portion of the vat 5 and are there connected by a cross pipe 31ª which preferably has upon its rear face a longitudinal slot 32 arranged to direct a spray or sheet of water upon the matrix at an angle thereto as the latter is lowered into and lifted from the vat or tank. A pipe 33 extends from a point near the bottom of the vat to the rear part of the machine and connects with the pump so that the liquid in the vat is constantly circulated, that is to say, drawn from the lower part of the vat and by means of the pump is conducted to the cross pipe 31ª and there again delivered to the vat.

In the preferred construction the driving pulley 29 which preferably operates both the pump and the pulley 19 is mounted on the same shaft with said pulley, and is controlled by a belt shifter (not shown) by means of which the belt 30 may be thrown on to a loose pulley or on to an operating pulley, as desired, so that the operation of the machine may be controlled and the device stopped at intervals to remove the matrix and to place a new one therein for treatment. 34 is a simple form of belt tightener which may be employed if desired.

35 is a guide for the counterweight 11 provided at its bottom with a stop 36 to limit the movement of the counterweight.

The preferred mode of operation is as follows.—The graphite or plumbago is mixed with water to the proper consistency, and the vat charged therewith. A suitable form or matrix is then placed upon the rotating bed plate 20 and locked thereto, when the device may be started. The vat is preferably filled with the fluid to a point slightly above the cross pipe 31ª and as the matrix is immersed in the liquid a jet or sheet of water extending across the whole face thereof is directed upon the matrix at an angle thereto, coating the face of the form and driving the graphite into the various depressions. As the matrix is lifted from the liquid it is given preferably a quarter turn, when it is again immersed as before, the liquid striking it at a different angle than before, and this operation is repeated until the matrix has been thus immersed, preferably not less than four times so as to bring every part of the matrix into position to be acted upon by the plate at a suitable angle to thoroughly and regularly deposit the black lead upon the form. The black lead thus is evenly distributed upon all parts of the form, each being equally treated and without to any appreciable extent dulling the sharp lines of the design, leaving them clear and sharp. This is found to be a marked advantage over the use of brushes which tend to dull the sharp lines and thus result in an injury to the design.

If preferred, in place of a longitudinal slot in the cross pipe 31ª a series of apertures may be formed therein tending to give a spraying effect in directing the liquid upon the matrix. The slot is preferred, however, as giving better and more satisfactory results. The liquid extends preferably above the pipe 31ª to prevent splashing. If preferred, the liquid may not extend above the point where the fluid is projected upon the matrix, the results, so far as the black leading of the matrix is concerned, being satisfactory when so treated.

It is obvious that various immaterial modifications may be made in my device without departing from the spirit of my invention, the object being to present every part of the matrix to the action of the impinging body of liquid, and changing the relative angle of the matrix to the moving liquid at each reciprocation so that every part of the matrix will be equally and effectively coated with the graphite.

Having thus described my invention, what I claim as new and desire to secure by Letters Patent is:

1. A device of the kind described, comprising a reciprocating frame and mechanism for operating the same, in combination with a bed plate rotatably mounted on said frame provided with means for removably securing the matrix thereto, means for partially rotating the bed plate at each reciprocation of the frame and means for directing a fluid upon the matrix at an angle thereto during a part of its travel.

2. A device of the kind described comprising a reciprocating frame and mechanism for operating the same and a vat arranged beneath the frame into which it is inserted at each reciprocation thereof, in combination with a bed plate rotatably mounted on said frame provided with means for removably securing the matrix thereto, means for partially rotating the bed plate at each reciprocation of the frame and means for directing fluid upon the matrix at an angle thereto during the time it is positioned within the vat.

3. A device of the kind described, comprising a reciprocating frame and mechanism for operating the same, and a vat arranged beneath the frame into which it is inserted at each reciprocation thereof, in combination with a bed plate rotatably mounted on said frame provided with means for removably securing the matrix thereto, means for partially rotating the bed plate at each reciprocation of the frame, a pipe extending horizontally across the upper part of the vat constructed along its side to direct a fluid upon the matrix while in the vat, and means for forcing a fluid through said pipe.

4. In a device of the kind described, a reciprocating frame and mechanism for operating the same, a vat arranged beneath the frame into which the latter is inserted and removed at each reciprocation thereof, in combination with a bed plate rotatably mounted on said frame provided with means for removably securing the matrix thereto, a fixed part arranged to engage a part of the rotating plate to partially rotate the latter at each reciprocation of the frame, a pipe extending from a point near the bottom of the vat to a pump and thence extending horizontally across the upper part of the vat constructed to direct a fluid upon the matrix in its passage thereby, and means for operating the pump.

5. A device of the kind described, comprising a reciprocating frame, guiding means for said frame, a sprocket wheel carrying a coöperating chain and provided with an arm attached to the frame, and means for driving the sprocket wheel, in combination with a bed plate rotatably secured to the frame and provided with means for securing a matrix thereto, means for partially rotating the bed plate at each reciprocation of the frame, and means for directing a liquid substantially across the face of the matrix at each reciprocation of the frame.

6. A device of the kind described comprising a suitable frame, provided with a vertically arranged vat near the lower part thereof, a pipe from a point near the bottom of said vat arranged to conduct a liquid therein to a pump, a pump connected with said pipe, and return pipes from the pump connected with a cross pipe arranged near the top of the vat and longitudinally constructed to discharge a liquid forced therethrough at an angle to the vat, in combination with a reciprocating frame, a counterweight for said frame, guiding means arranged within the device for the frame, a bed plate rotatably mounted upon the frame and provided with means for removably securing a matrix thereto and means for reciprocating said frame, whereby a liquid is discharged upon the matrix at each reciprocation of the frame.

7. A device of the kind described, comprising a suitable frame, provided with a vertically arranged vat near the lower part thereof, a pipe from a point near the bottom of said vat arranged to conduct a liquid therein to a pump, a pump connected with said pipe and return pipes from the pump connected with a cross pipe arranged near the top of the vat and longitudinally constructed to discharge a liquid forced therethrough at an angle to the vat, in combination with a reciprocating frame, a counterweight for said frame, guiding means arranged within the device for the frame, a bed plate rotatably mounted upon the frame and provided with means for removably securing a matrix thereto, means for partially rotating the bed plate at each reciprocation, and means for reciprocating said frame, whereby a liquid is discharged upon the matrix at a different angle thereto at each reciprocation of the frame.

In testimony whereof, I have hereunto signed my name in the presence of two subscribing witnesses.

GEORGE H. BENEDICT.

Witnesses:
   JOHN W. HILL,
   CHARLES I. COBB